J. W. MAGEE.
HARROW.
APPLICATION FILED AUG. 3, 1911.

1,041,313.

Patented Oct. 15, 1912.

Witnesses

John W. Magee,
Inventor
by
Attorneys

UNITED STATES PATENT OFFICE.

JOHN W. MAGEE, OF NORFIELD, MISSISSIPPI.

HARROW.

1,041,313.

Specification of Letters Patent.   Patented Oct. 15, 1912.

Application filed August 3, 1911. Serial No. 642,101.

*To all whom it may concern:*

Be it known that I, JOHN W. MAGEE, a citizen of the United States, residing at Norfield, in the county of Lincoln and State of Mississippi, have invented a new and useful Harrow, of which the following is a specification.

This invention relates to harrows, its principal object being to provide harrow teeth pivotally connected to cross bars which, in turn, are mounted to swing relatively to the beam of the harrow, there being means connected to the bars for adjustably engaging the beam so as to hold said bars at any predetermined angle relative to the beam.

A further object is to provide adjusting means which also serve to brace the cross bars and beam.

A further object is to provide an improved form of beam for use in connection with the harrow and to provide handles adjustable relative to the beam.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

Figure 1:
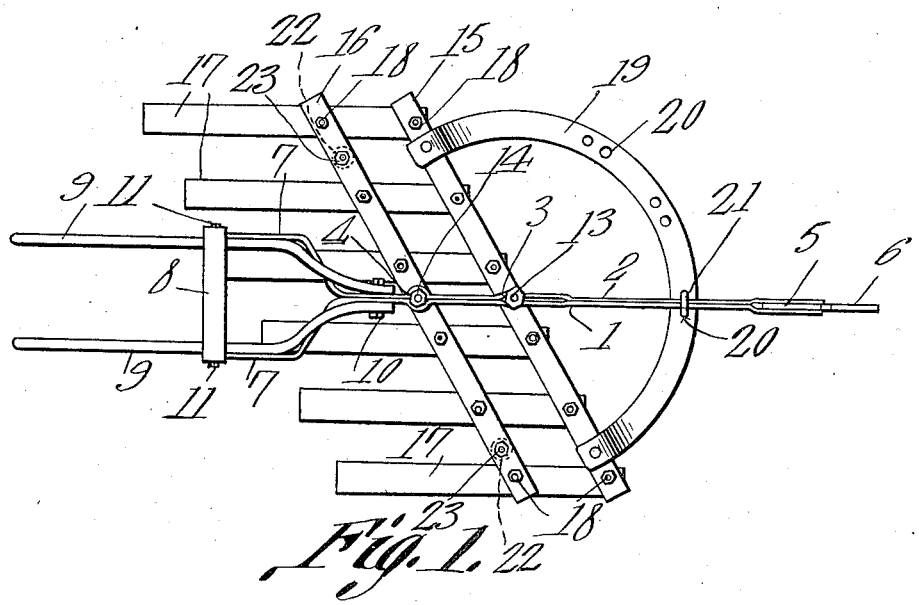
Figure 2:
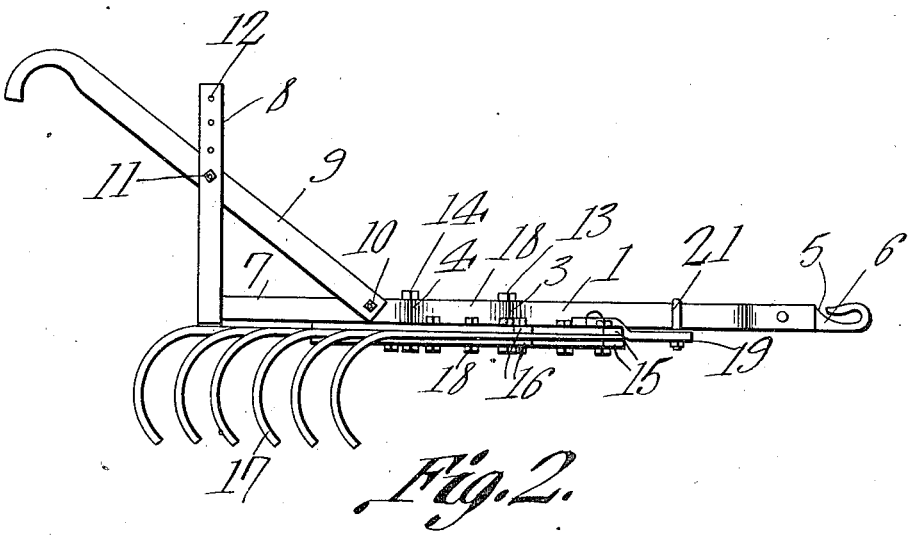

In said drawings:—Figure 1 is a plan view of the harrow. Fig. 2 is a side elevation thereof.

Referring to the figures by characters of reference 1 and 2 constitute parallel metal strips coöperating to form the beam of the harrow, these strips having registering offset portions forming eyes 3 and 4 while the strips are spaced apart at one end to receive a plate 5 therebetween, said plate having a hook 6 extending from it. The strips 1 and 2 are spread apart at their rear ends and extended along parallel lines, as indicated at 7, these arms 7 having a yoke 8 pivotally connected to the rear ends thereof. Handles 9 converge forwardly and downwardly and are pivotally connected to the strips 1 and 2, as indicated at 10, these arms extending through the yoke and being adjustably connected to it by bolts 11. A series of openings 12 is formed in each side of the yoke and each bolt is adapted to be placed in any one of the openings of a series. It is thus possible to adjust the handles angularly.

Pivot bolts 13 and 14 are secured within the eyes 3 and 4 respectively, the lower portions of these bolts being extended through the centers of bars 15 and 16. Two bars 15 are employed, an upper bar and a lower bar, and upper and lower bars 16 are also utilized. Harrow teeth 17 are extended between the upper and lower bars 15 and 16 and are pivotally connected to them by bolts 18 or the like. These teeth can be of the usual or any other preferred type of harrow teeth. A semi-circular brace bar 19 is supported in front of the bars 15 and is secured, at its ends, to the upper one of said bars, this brace bar 19 being concentric with the pivot bolt 13 and being formed with apertures 20 arranged in pairs. The apertures of any one of these pairs are adapted to receive the end portions of a U-bolt 21 which are engaged by nuts or other suitable fastening devices.

It is to be understood that the openings 20 are to be so located as to permit the reinforcing or brace bar 19 to be held in any one of a predetermined number of positions. When it is desired to hold the cross bars 15 and 16 at right angles to the harrow, the U-bolt 21 is detached from the brace bar 19 and said bar is shifted under the beam until the middle portion thereof is brought beneath the beam. The U-bolt is then placed astride the beam and into the openings 20 adjacent thereto and secured. By placing the U-bolt in other apertures 20, the bars 15 and 16 can be held at desired angles to the beam.

In order that the adjustment of the harrow may be easily effected, spacing washers 22, indicated by dotted lines in Fig. 1, are interposed between the bars 16 and held in place by bolts 23. The bars 15 are also similarly spaced apart.

What is claimed is:—

1. A harrow including a beam, bars pivotally connected, at their centers, to the beam, said bars being arranged in pairs, harrow teeth extending between the bars of the two pairs and pivotally connected to them, said teeth being parallel and constituting means for holding the two pairs of bars parallel, a semi-circular brace bar secured at its ends to the bars of the front pair and extending close to and under the beam, and means straddling the beam and adjustably connected to the semi-circular brace for holding the brace against movement relative to the beam.

2. A harrow including parallel strips secured together and constituting a beam, said strips having registering offset portions forming eyes, pivot bolts extending through the eyes, front and back bars pivotally connected, at their centers, to the bolts, parallel harrow teeth pivotally connected to said bars and extending rearwardly therefrom, said bars being parallel, a semi-circular brace bar secured at its ends to the end portions of the front bar and extending under the beam, and a clamping bolt straddling the beam and adjustably connected to the bar to hold the bars against movement relative to the beam.

In testimony that I claim the foregoing as my own, I have hereto affixed my signature in the presence of two witnesses.

JOHN W. MAGEE.

Witnesses:
T. W. SMITH,
L. S. MONTGOMERY.

Copies of this patent may be obtained for five cents each, by addressing the "Commissioner of Patents, Washington, D. C."